United States Patent
Ward et al.

(10) Patent No.: US 12,105,351 B2
(45) Date of Patent: Oct. 1, 2024

(54) RECONFIGURABLE REFLECTIVE ROAD MARKER

(71) Applicant: NuVue Products Ltd., Toronto (CA)

(72) Inventors: Douglas K. Ward, Toronto (CA); Ken Miller, Scarborough (CA)

(73) Assignee: NuVue Products Ltd., Toronto (CA)

( * ) Notice: Subject to any disclaimer, the term of this patent is extended or adjusted under 35 U.S.C. 154(b) by 409 days.

(21) Appl. No.: 17/364,002

(22) Filed: Jun. 30, 2021

(65) Prior Publication Data
US 2023/0003967 A1    Jan. 5, 2023

(51) Int. Cl.
*E01F 9/619* (2016.01)
*G02B 7/182* (2021.01)

(52) U.S. Cl.
CPC .............. *G02B 7/182* (2013.01); *E01F 9/619* (2016.02)

(58) Field of Classification Search
CPC .......... E01F 9/619; E01F 9/658; G02B 5/132; G02B 5/136; G02B 7/18
USPC ....................................................... 116/63 R
See application file for complete search history.

(56) References Cited

U.S. PATENT DOCUMENTS

| | | | |
|---|---|---|---|
| D183,687 S | 10/1958 | Fuller et al. | |
| 3,066,577 A | 12/1962 | Gunderson | |
| 3,292,569 A | 12/1966 | Trigilio | |
| 3,455,156 A * | 7/1969 | Kelly | G01M 17/02 116/63 P |
| 3,716,288 A | 2/1973 | Kannenberg | |
| 3,768,434 A | 10/1973 | Pinter | |
| 3,834,789 A | 9/1974 | Brudy | |
| 3,905,680 A | 9/1975 | Nagel | |
| 3,905,681 A * | 9/1975 | Nagel | G02B 5/124 359/533 |
| 3,911,854 A * | 10/1975 | Manuel | A63B 71/00 116/63 P |
| D290,240 S | 6/1987 | Rynberk | |
| D329,394 S | 9/1992 | Parsons et al. | |
| 6,149,339 A * | 11/2000 | Salloum | E01F 9/654 116/63 P |
| 6,681,715 B2 * | 1/2004 | Wood | E01F 9/688 116/63 P |
| D527,302 S * | 8/2006 | Vladamirov | D11/131 |
| 7,827,715 B2 * | 11/2010 | Thissen | G09F 7/00 116/63 P |
| 10,422,089 B1 | 9/2019 | Devine | |

* cited by examiner

Primary Examiner — Gary S Hartmann (57) ABSTRACT

A reflective marker including first and second reflectors, each having a first and second reflective outer surfaces spaced apart by a peripheral rim. The first reflector further including a central region including a first open portion extending through the first reflector peripheral rim and a raised rib defining a blind hole extending from the first open portion for receiving a support post. The second reflector further including a central region including a second open portion extending through the second reflector peripheral rim and a raised rib defining a through bore extending from the second open portion for receiving the support post. The first open portion of the first reflector central region is sized to receive the raised rib of the second reflector central region and the second open portion of the second reflector central region is sized to receive the raised rib of the first reflector central region.

20 Claims, 8 Drawing Sheets

Fig. 13

RECONFIGURABLE REFLECTIVE ROAD MARKER

TECHNICAL FIELD

The present disclosure relates to a reflective road or driveway marker and, more specifically, to reconfigurable reflective road or driveway marker that includes a pair of pair of reflectors mounted on a support rod or post capable of insertion into the ground, the pair of reflectors being mountable to the support post in a variety interlocking, positional orientations to provide multiple reflector configurations, such as an overlapping configuration and a stacked configuration, as desired by the user.

BACKGROUND

Reflective road or driveway markers are widely used to mark the edge or boundary of a roadway or driveway to aid vehicle drivers in determining where and when to turn, e.g., turning from a road onto a driveway or vice versa, or to guide vehicle drivers as they travel along a road or driveway to avoid running off the road or driveway onto unpaved ground and/or culverts/ditches extending along the road or driveway. Typical reflective road or driveway markers include one or more reflectors mounted on a support standard, such as a support post or support rod that can be inserted into the ground adjacent the road or driveway. The reflectors are illuminated by vehicle headlights/taillights and reflect light back toward the vehicle, thereby serving to guide the driver of the vehicle, especially in nighttime driving conditions. Because a driveway (or road) may intersect a road (or another portion of the driveway) at a substantially right angle, it may be desirable to have a pair of reflectors of the reflective marker facing in two generally orthogonal direction at the intersection such that a first reflector of the pair of reflectors may be seen when illuminated by vehicle headlights of vehicles traveling along the first road (or driveway) and a second reflector, positioned orthogonally with respect to the first reflector, may be seen when illuminated by vehicle headlights of vehicles traveling along the second orthogonal road (or driveway). However, in other road or driveway layouts where marking the edge or boundary of the road or driveway, the vehicle traffic may be only along a single direction (e.g., vehicles travel along the driveway or road in an east/west direction only), in such situations, it would be desirable to have both reflectors facing in the same direction for maximum visibility. Thus, it would be desirable to provide a road or driveway marker with a pair of reflectors that may be reconfigured by the user to have the reflectors positioned on the standard to face in the same direction or to have the reflectors positioned on the standard to face in substantially orthogonal directions.

Roadway or driveway markers including an interfitting pair of stacked reflectors configured to permit a number of angular relationships between the two reflectors positioned in stacked relationship on a support standard, such as support rod or post, are known. For example, U.S. Pat. No. 3,716,288 to Kennenberg discloses a driveway reflector wherein two or more reflectors may be mounted in a stacked relationship on a standard. For each reflector, a circular frame provides opposing annular seats for supporting a pair of reflecting members. The frame includes a pair of spring-like arms for holding the reflector in place on the rod by compressive force. The frame also includes an octagonal shaped projection extending from an outer circumference of the frame and a mating embossment defining an orthogonal shaped opening extending from the outer circumference of the frame, the projection and embossment being spaced 180 degrees apart. The octagonal shaped projection of the embossment of one reflector is received in the mating the octagonal shaped opening of the embossment of the adjacent reflector. The interfitting of the two stacked reflectors, that is, the interfitting of the octagonal projection and the octagonal opening of the two stacked reflectors, allows the user to select/change the angular relation between the two stacked reflectors between eight possible orientations, for example, from an orientation where the two reflectors are in parallel relationship to an orientation where the two reflectors are in an orthogonal relationship. U.S. Pat. No. 3,768,434 to Pinter also discloses a driveway reflector having an octagonal interfitting of an octagonal shaped boss of an upper reflector into a hexagonal hole in a boss of a lower reflector. Again, the two stacked reflectors allow for changing the orientation of the two stacked reflectors.

In both of the aforesaid patents, the pair of reflectors are in a vertically stacked relationship on the standard, that is, the entirety of the first reflector is vertically positioned above the second reflector in any angular desired relationship of the reflectors, i.e., the pair of reflectors is in a vertically stacked relationship on the standard when the angular relationship of the reflectors are parallel (both reflectors facing in the same direction) and when the angular relationship of the reflectors are orthogonal (the reflectors being at right angles, that is, facing in directions that are 90 degrees apart), or any other angular relation.

U.S. Pat. No. 3,292,569 to Trigilio discloses a portable, foldable roadside warning device for disabled vehicles. The reflector assembly includes a spinning vane having two reflectors. The vane includes a central tubular portion which is welded to a semicircular central channel. The central tubular portion of the vane is rotatably mounted on a rod. The vane spins under wind pressure. Mounted to the upper portion of the vane is a pair of upper reflectors. The upper reflectors are mounted to a metal frame. Projecting ends of the metal frame slide over the outer surfaces of the central tubular portion and the semicircular central channel, thereby providing a rigid interlocking of the metal frame and the vane such that the metal frame and the upper reflectors spin with the vane. The direction of the upper reflectors is 90 degrees offset from the two reflectors mounted on the vane. Again, in the aforesaid '569 patent, the pair of upper reflectors is positioned vertically above the spinning vane reflectors with respect to the rod.

SUMMARY

In one aspect, the present disclosure relates to a reflective marker for marking driveways and roadways, the reflective marker comprising: a) a support post having an upper portion and a lower portion for securing the reflective marker to a substrate; b) a first reflector bisected by a central axis, the first reflector including a first outer surface, a second outer surface and a peripheral rim extending between the first and second outer surfaces, the first outer surface including a first reflecting surface and the second outer surface including a second reflecting surface facing in a direction transverse to the first reflecting surface, the first reflector further including a central region extending along the central axis, the central region including a first open portion extending through the peripheral rim and a raised rib including an opening sized to receive the upper portion of the support post; c) a second reflector bisected by a central axis, the second reflector including a third outer surface, a fourth outer surface and a peripheral rim extending between the third and fourth outer surfaces, the third outer surface including a third reflecting surface and the fourth outer surface including a fourth reflecting surface facing in a direction transverse to the third reflecting surface, the second reflector further including a central region extending along the central axis including a second open portion extending through the peripheral rim and a raised rib defining a through bore extending from the second open portion, a diameter of the through bore sized to receive the upper portion of the support post; and d) wherein, in an overlapping configuration of the first and second reflectors, the raised rib of the central region of the second reflector is received in the first open portion of the central region of the first reflector and the raised rib of the central portion of the first reflector is received in second open portion of the central region of the second reflector.

In another aspect, the present disclosure relates to a reflector assembly adapted to be secured to a support post for marking driveways and roadways, the reflector assembly comprising: a) a first reflector bisected by a central axis, the first reflector including a first outer surface, a second outer surface and a peripheral rim extending between the first and second outer surfaces, the first outer surface including a first reflecting surface and the second outer surface including a second reflecting surface facing in a direction transverse to the first reflecting surface, the first reflector further including a central region extending along the central axis, the central region including a first open portion extending through the peripheral rim and a raised rib extending from the first open portion and including an opening sized to receive an upper portion of a support post; b) a second reflector bisected by a central axis, the second reflector including a third outer surface, a fourth outer surface and a peripheral rim extending between the third and fourth outer surfaces, the third outer surface including a third reflecting surface and the fourth outer surface including a fourth reflecting surface facing in a direction transverse to the third reflecting surface, the second reflector further including a central region extending along the central axis including a second open portion extending through the peripheral rim and a raised rib extending from the second open portion and including an opening sized to receive an upper portion of a support post; and c) wherein, in an overlapping configuration of the first and second reflectors, the first open portion of the central region of the first reflector receives the raised rib of the central region of the second reflector and the second open portion of the central region of the second reflector receives the raised rib of the central region of the first reflector.

In another aspect, the present disclosure relates to a reflective marker comprising: a) a support post having an upper portion and a lower portion for securing the reflective marker to a substrate; b) a first reflector bisected by a central axis, the first reflector including a peripheral rim, a first reflecting surface and a second reflecting surface facing in a direction transverse to the first reflecting surface, the first reflector further including a central region extending along the central axis, the central region including a first open portion extending through the peripheral rim and a raised rib including an opening sized to receive the upper portion of the support post; c) a second reflector bisected by a central axis, the second reflector including a peripheral rim, a third reflecting surface and a fourth reflecting surface facing in a direction transverse to the third reflecting surface, the second reflector further including a central region extending along the central axis including a second open portion extending through the peripheral rim and a raised rib defining a through bore extending from the second open portion, a diameter of the through bore sized to receive the upper portion of the support post; and d) the first open portion of the central region of the first reflector is sized to receive the raised rib of the central region of the second reflector and the second open portion of the central region of the second reflector is sized to receive the raised rib of the central region of the first reflector.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

The present disclosure relates to a reflective road/roadway or driveway marker 100 that includes reflector assembly 200, which one exemplary embodiment comprises a pair of reflectors 210, mounted to a mounting or support post, support rod, or support standard 110. The support post 110 is typically driven into ground adjacent an edge or boundary of a driveway or road/roadway to mark the edge or boundary of a driveway or road/roadway and, thus, is typically installed in a vertical position. That is, a longitudinal extent or longitudinal axis LA of the mounting post 110 extends in a vertical direction V with respect to the ground or substrate. The roadway or driveway marker 100 of the present disclosure may also be used to mark sidewalks, bike paths, hiking trails, obstructions, and the like. The pair of reflectors 210, including a first or upper reflector 220 and a second or lower reflector 320, are advantageously reconfigurable between a parallel positional relationship 400 (FIGS. 6-7), wherein both reflectors aligned to face in the same direction, and an orthogonal positional relationship 410 (FIGS. 1-5B), wherein the respective reflectors are facing in directions 90 degrees apart. Advantageously, the reconfigurable road or driveway marker 100 of the present disclosure, the pair of reflectors 210 are configured to be interfitting, interlocking and overlapping such that when configured in the orthogonal positional relationship 410 (that is, the first and second reflectors being at right angles or orthogonal to each other), the first and second reflectors 220, 320 are at substantially the same vertical height, that is, the reflectors 220, 320 are in an overlapping position or overlapping configuration 412 along the longitudinal extent or longitudinal axis LA of the support post 110.

Figure 6:
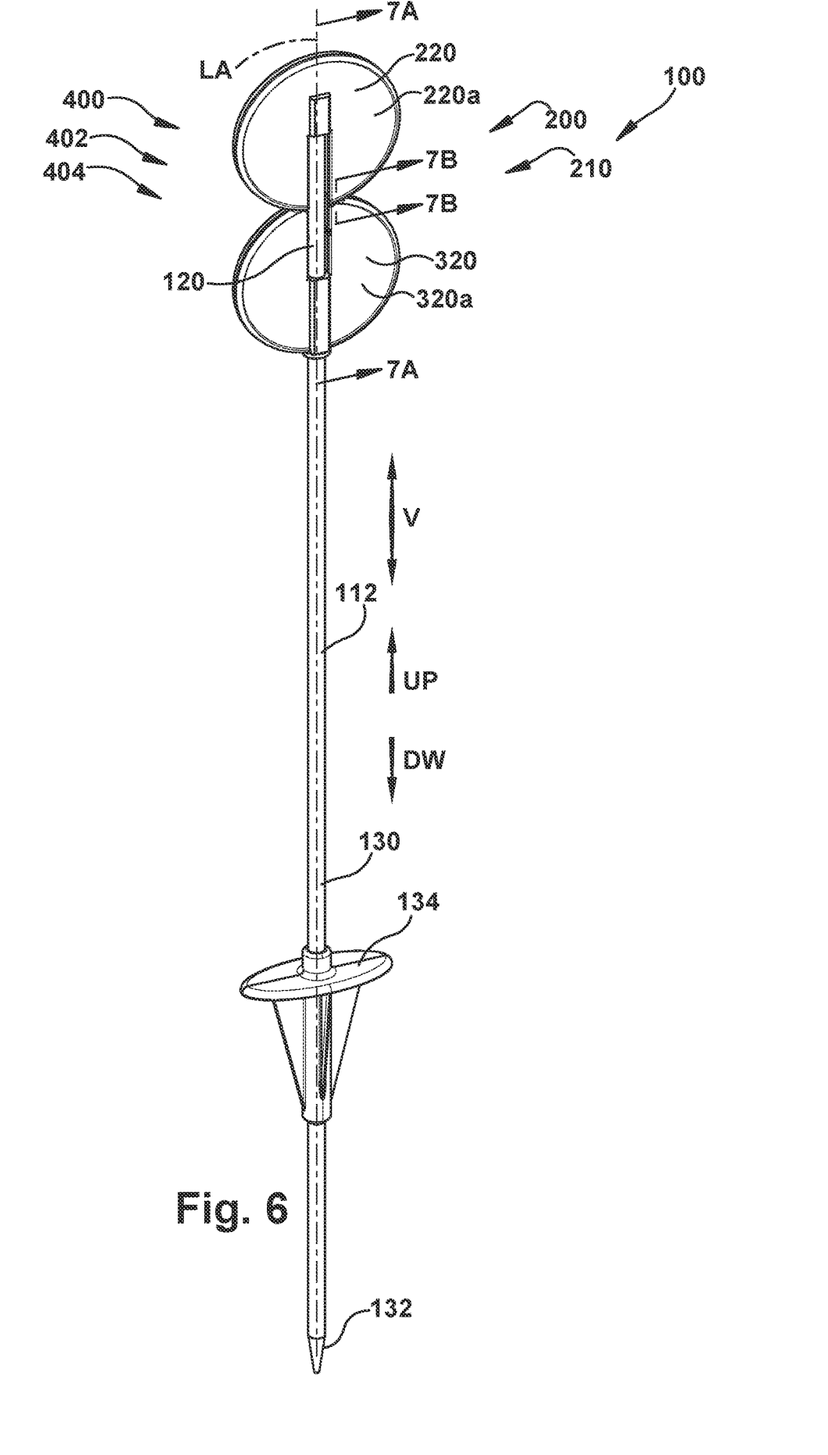
FIG. 6 is a schematic perspective view of the road or driveway marker of FIG. 1, which the pair of reflectors in a parallel positional relationship or stacked configuration or two-way orientation of the marker.
Figures 7A, 7B:
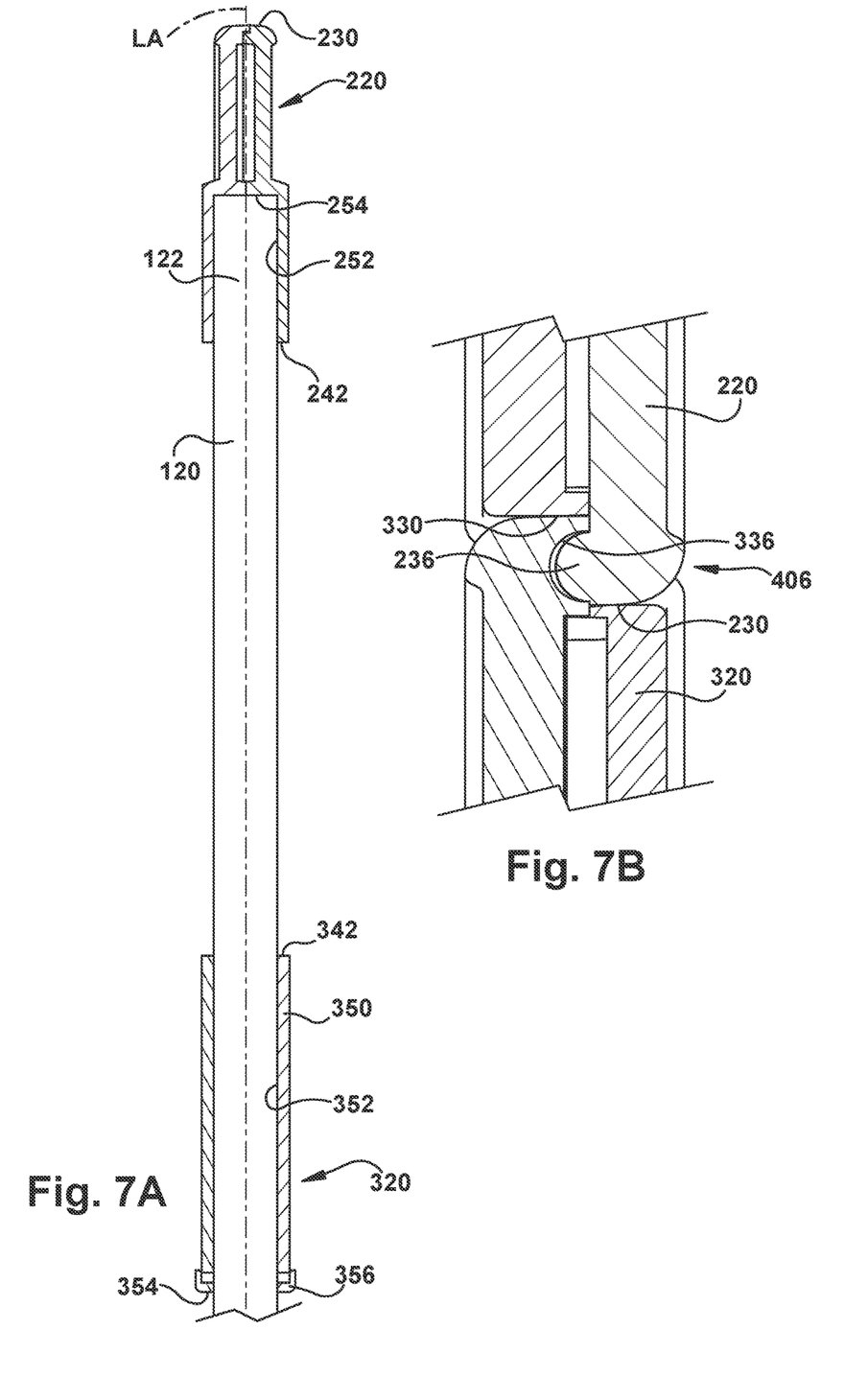
FIG. 7A is a schematic longitudinal section view of an upper portion of the road or driveway marker of FIG. 6, as seen from a plane indicated by the line 7A-7A in FIG. 6.
FIG. 7B is a schematic enlarged vertical section view of a lower portion of a first or upper reflector and an upper portion of a second or lower reflector of the pair of reflectors showing the interlocking of the first and second reflectors when the pair of reflectors are in the parallel positional relationship depicted in FIG. 6, as seen from a plane indicated by the line 7B-7B in FIG. 6.

By contrast, as shown in FIG. 6, when the pair of reflectors 210 ae configured in the parallel position relationship 400 (that is, the first and second reflectors being aligned and facing in the same direction), the pair of reflectors 210 are in a stacked position or stacked configuration 402, that is, the first and second reflectors 220, 320 are at different vertical heights as measured along the longitudinal axis LA of the support post 110. Advantageously, when the marker 100 of the present disclosure is used in the orthogonal positional relationship 410, the pair of reflectors 210 present a compact and aesthetically pleasing appearance since they are in the overlapping configuration 412. Additionally and advantageously, the road marker 100 of the present disclosure also provides for an interlocking of the first and second reflectors 220, 320 of the reflector assembly 200 in both the parallel position relationship 400 and the orthogonal positional relationship 410, thus, avoiding any undesirable separation of the pair of reflectors 210 along the support post 110 in either the overlapping configuration 412 or the stacked configuration 402. In the parallel position relationship 400, that is, the stacked configuration 402, as best seen in FIG. 7B, there is a slight overlap of the first and second reflectors 220, 320 in an interlocking region 406 between the first and second reflectors 220, 320.

The first reflector 220 includes a body 220a having oppositely facing first and second reflective surfaces 222, 224 while the second reflector 320 similarly includes a body 320a having oppositely facing first and second reflective surfaces 332, 334. The orthogonal positional relationship 410 of the pair of reflectors 210 may be referred to as the four-way orientation 414 of the driveway marker 100 because the reflectors 230, 330 define reflective surfaces 222, 322, 224, 324, each facing 90 degrees apart, thus, the reflective surfaces 222, 224, 322, 324 of the marker 100 are visible in four orthogonal directions, e.g., both east-west and north-south. The parallel positional relationship 400 of the pair of reflectors 210 may be referred to as the two-way orientation 404 of the driveway marker 100 because the reflectors 230, 330 define reflective surfaces 222, 232 and 224, 234, each facing 180 degrees apart, thus, the reflective surfaces 222, 224, 322, 324 of the marker 100 are visible in two orthogonal directions, e.g., either east-west or north-south.

First Exemplary Embodiment—Reflective Marker 100

Turning to the drawings, FIGS. 1-13 schematically depict a first exemplary embodiment of the reflective driveway or road maker 100. The marker 100 includes the rigid support post 110 and the reflector assembly 200 including the pair of reflectors 210 mounted to the support post 110. The pair of reflectors 210 includes the first reflector 220 and the second reflector 320 mounted on an upper portion 120 of the support post 110 in a selected one of the orthogonal positional relationship 410 (corresponding to the overlapping configuration 412 and the four-way orientation 414) and the parallel positional relationship 400 (corresponding to the stacked configuration 402 and the two-way orientation 404). A lower portion 130 of the support post 110 is adapted to be driven into the ground or a substrate and includes a tapered end 132 to facilitate insertion of the support post 110 into the ground by a user. In one exemplary embodiment, the support post comprises an 8 mm fiberglass rod and the lower portion 130 includes a foot 134 extending radially outwardly from an outer surface 112 of the support post 110, again, to facilitate insertion of the support post 110 into the ground.

Figure 8:
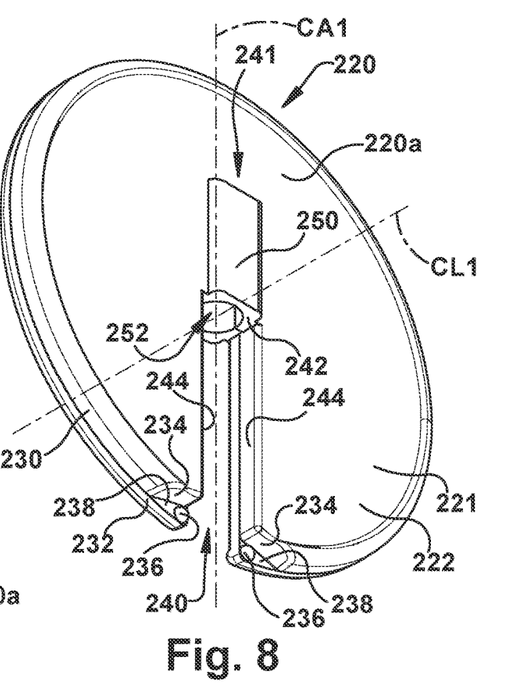
FIG. 8 is a schematic front perspective view of the first reflector of the pair of reflectors of the road or driveway marker of FIG. 1.
Figure 9:
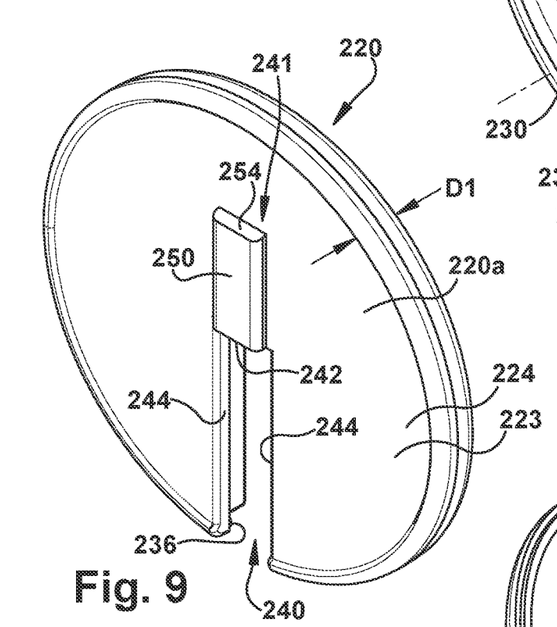
FIG. 9 is a schematic rear perspective view of the first reflector of FIG. 8.
Figure 10:
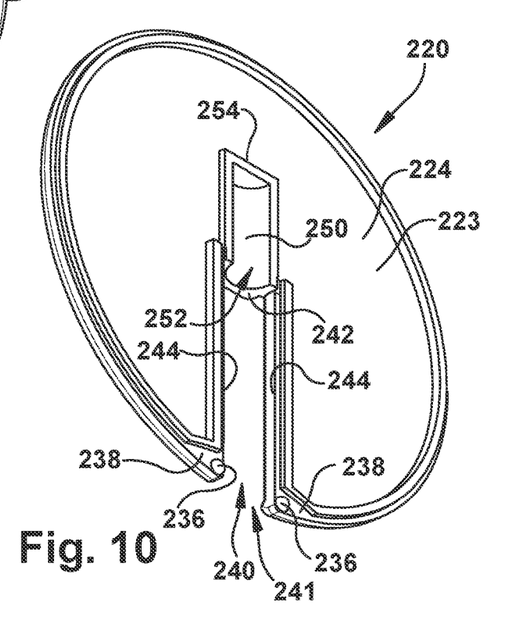
FIG. 10 is a schematic perspective, longitudinal section view of the first reflector of FIG. 8.

As best seen in FIGS. 8-10, the first reflector 220 of the pair of reflectors 210 comprises the body 220a including first and second walls 221, 223 spaced apart by a peripheral rim 230. The first wall 221 includes the first reflective surface 222 and the second wall 223 includes the second reflective surface 224. In one exemplary embodiment, the body 220a of the first reflector 220 comprises first and second members, the first member including the first wall 221 (and first reflective surface 222) and the second member including the second wall 223 (and second reflective surface 224), permanently affixed by sonic welding or other fastening means known to those of skill in the art. Alternately, the body 220a may be fabricated of a single piece of material. The first and second reflective surfaces 222, 224 are generally planar extending substantially parallel to and spaced from a central vertical plane VP1 (FIGS. 2, 3 and 5B) of the first reflector 220. Extending along a central axis CA1 of the first reflector 220 is a central region 241 including a central cavity or first central open portion 240. The first central open portion 240 extends through the peripheral rim 230 and terminates approximately at a center line CL1 of the first reflector 220, that is, the first central open portion 240 extends radially approximately one half of a diameter of the body 220a of the first reflector 220, as measure along the central axis CAE The center line CL1 of the first reflector 220 is orthogonal to and intersects the central axis CA1 of the first reflector 220, the peripheral rim 230 being centered about the center line CL1. The central axis CA1 of the first reflector 220 extends along and is coincident with the central vertical plane VP1 of the first reflector 220 and is orthogonal to and intersected by the center line CL1.

The first central open portion 240 of the central region 241 of the first reflector 220 is defined by a pair of side walls 244 and an end wall 242. The central region 241 further includes a rib 250 extending from the end wall of 242 of the first central open portion 240. The rib 250 protrudes slightly outwardly from the respective planar surfaces of the first and second reflective surfaces 222, 224. The rib 250 extends between the lower end wall 242 (that is, the end wall 242 bounding the first central open portion 240 is also the upper end wall 242 of the rib 250) and an upper end wall 254. The rib 250 defines an opening or blind hole 252 centered about the central axis CA and terminating short of the peripheral rim 230. That is, the blind hole 252 is not a through bore which would extend though the peripheral rim 230 of the first reflector 220. Rather, the blind hole 252 extends approximately halfway from the end wall 242 of the first central opening or first central open portion 240 toward the peripheral rim 230. The blind hole 252 is sized to snugly receive an upper end or distal section 122 of the upper portion 120 of the support post 110.

In a lower region of the peripheral rim 230 where side walls 244 of the first central opening 240 of the first reflector 220 intersect the peripheral rim 230 there are a pair of cut out regions 234 each of which extends approximately half way of a total depth D1 between the first and second outer reflective surfaces 222, 224. Each of the pair of cut out regions 234 includes a generally planar base 238 extending along the central vertical plane VP1 of the first reflector 220. Each base 238 includes a laterally extending projection 236 which extends orthogonally with respect to the base 238. The laterally extending projections 236 of the first reflector 220 engage corresponding laterally extending recesses 336 of the second reflector 320 to interlock the first and second reflectors 220, 320 when the pair of reflectors 210 are in the parallel position relationship 400 or stacked configuration 402 (FIG. 6).

Figure 11:
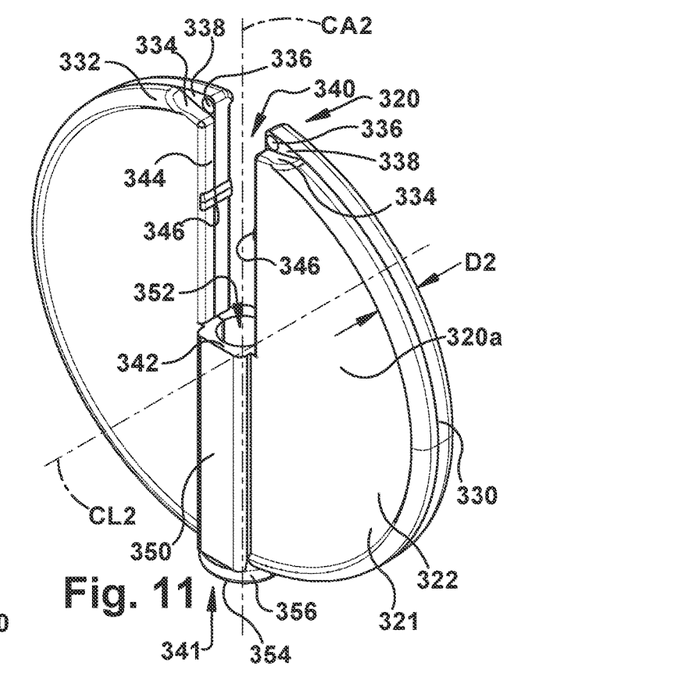
FIG. 11 is a schematic front perspective view of the second reflector of the pair of reflectors of the road or driveway marker of FIG. 1.
Figure 12:
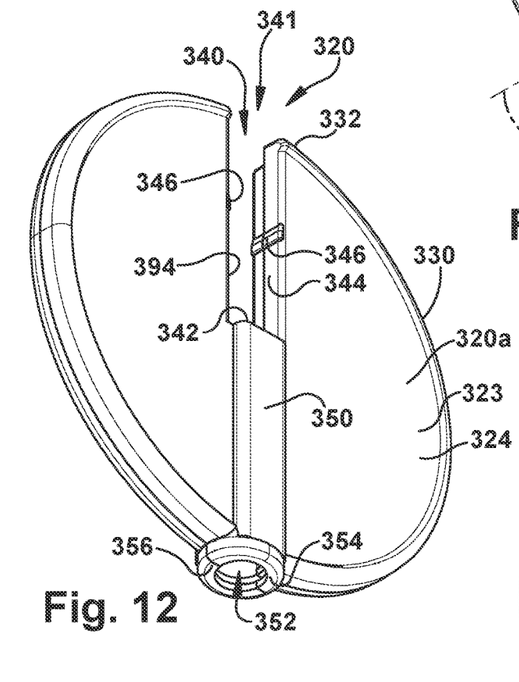
FIG. 12 is a schematic rear perspective view of the second reflector of FIG. 11.
Figure 13:
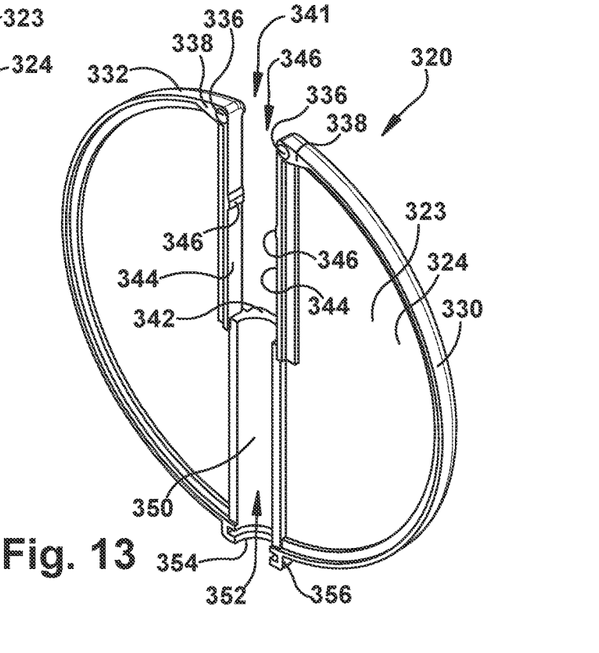
FIG. 13 is a schematic perspective, longitudinal section view of the second reflector of FIG. 11.

As best seen in FIGS. 11-13, the second reflector 320 of the pair of reflectors 210 comprises the body 320a including third and fourth walls 321, 323 spaced apart by a peripheral rim 330. The third wall 321 includes the third reflective surface 222 and the fourth wall 223 includes the fourth reflective surface 224. In one exemplary embodiment, the body 321 of the second reflector 320 comprises first and second members, the first member including the third wall 321 (and third reflective surface 322) and the second member including the fourth wall 323 (and fourth reflective surface 324), permanently affixed by sonic welding or other fastening means known to those of skill in the art. Alternately, the body 321 may be fabricated of a single piece of material. The third and fourth reflective surfaces 322, 324 are generally planar extending substantially parallel to and spaced from a central vertical plane VP2 (FIGS. 3 and 5A) of the second reflector 320. Extending along a central axis CA2 of the second reflector 320 is a central region 341 including a second central cavity or central open portion 340. The second central open portion 340 extends through the peripheral rim 330 and terminates approximately at a center line CL2 of the second reflector 320, that is, the second central open portion 340 extends radially approximately one half of a diameter of the body 320a of the second reflector 320, as measure along the central axis CA2. The center line CL2 of the second reflector 320 is orthogonal to and intersects the central axis CA2 of the second reflector 320, the peripheral rim 330 being centered about the center line CL2. The central axis CA2 of the second reflector 320 extends along and is coincident with the central vertical plane VP2 of the second reflector 320 and is orthogonal to and intersected by the center line CL2.

The second central open portion 340 of the central region 341 of the second reflector 320 is defined by a pair of side walls 344 and an end wall 342. The central region 341 further includes a rib 350 extending from the end wall of 342 of the second central open portion 340. The rib 350 protrudes slightly outwardly from the respective planar surfaces of the first and second reflective surfaces 322, 324. The rib 350 defines an opening or through bore 352 centered about the central axis CA and extending through the peripheral rim 330. The through bore 352 is sized to snugly receive the upper portion 120 of the support post 110. The rib 350 and the through bore 352 extend from the end wall 342 (that is, the end wall 342 bounding the second central open portion 340 is also the upper end wall 342 of the rib 350) and extend through the peripheral rim 330. An end wall 354 of the rib 350 defines a protruding cylindrical boss 356 that extends slightly beyond the peripheral rim 330. The cylindrical boss 356 defines a bearing surface for an o-ring (not shown) that is positioned on the support post 110 to mitigate any tendency for the second reflector 320 to travel downwardly along the support post 110 in the downward vertical direction DW. The pair of side walls 344 of the second reflector 320 each include a radially inwardly extending tab 346. The pair of tabs 346 of the pair of side walls 344 are aligned and extend in a direction toward each other and, when viewed in front elevation view, extend toward the central axis CA2 of the second reflector 320.

Figure 1:
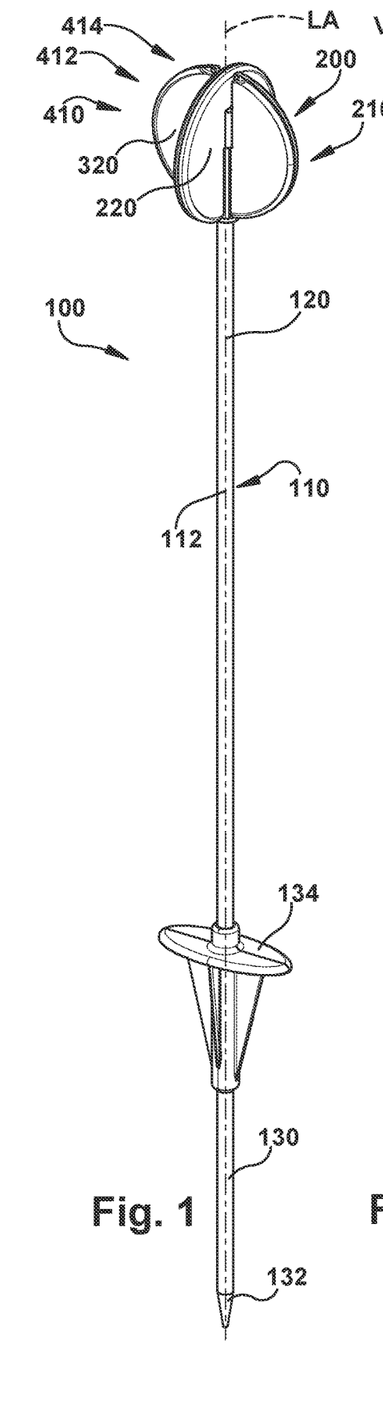
FIG. 1 is a schematic perspective view of a first exemplary embodiment of a reflective road or driveway marker of the present disclosure, with a pair of reflectors in an orthogonal positional relationship or overlapping configuration or four way orientation of the marker.
Figures 2, 3:
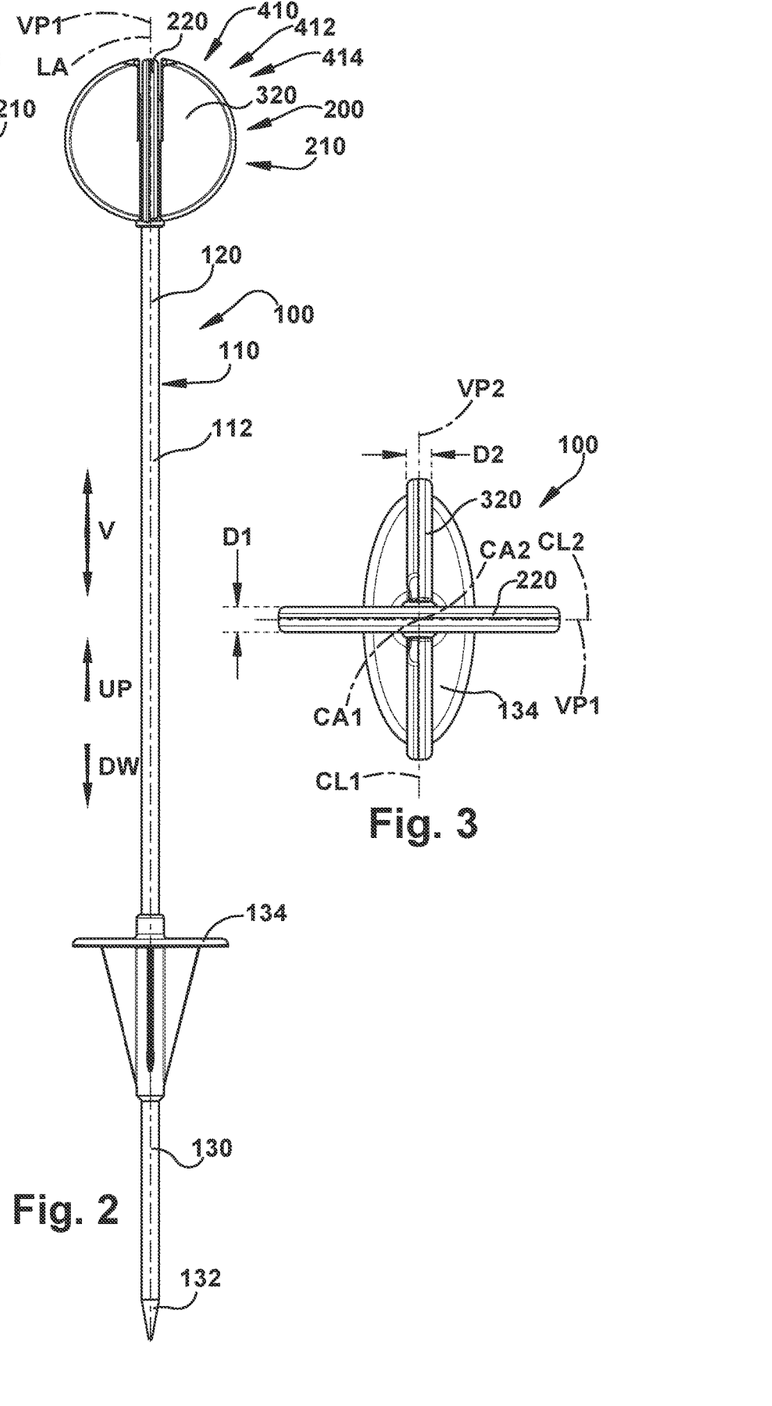
FIG. 2 is a schematic side elevation view of the road or driveway marker of FIG. 1.
FIG. 3 is a schematic top plan view of the road or driveway marker of FIG. 1.
Figure 4:
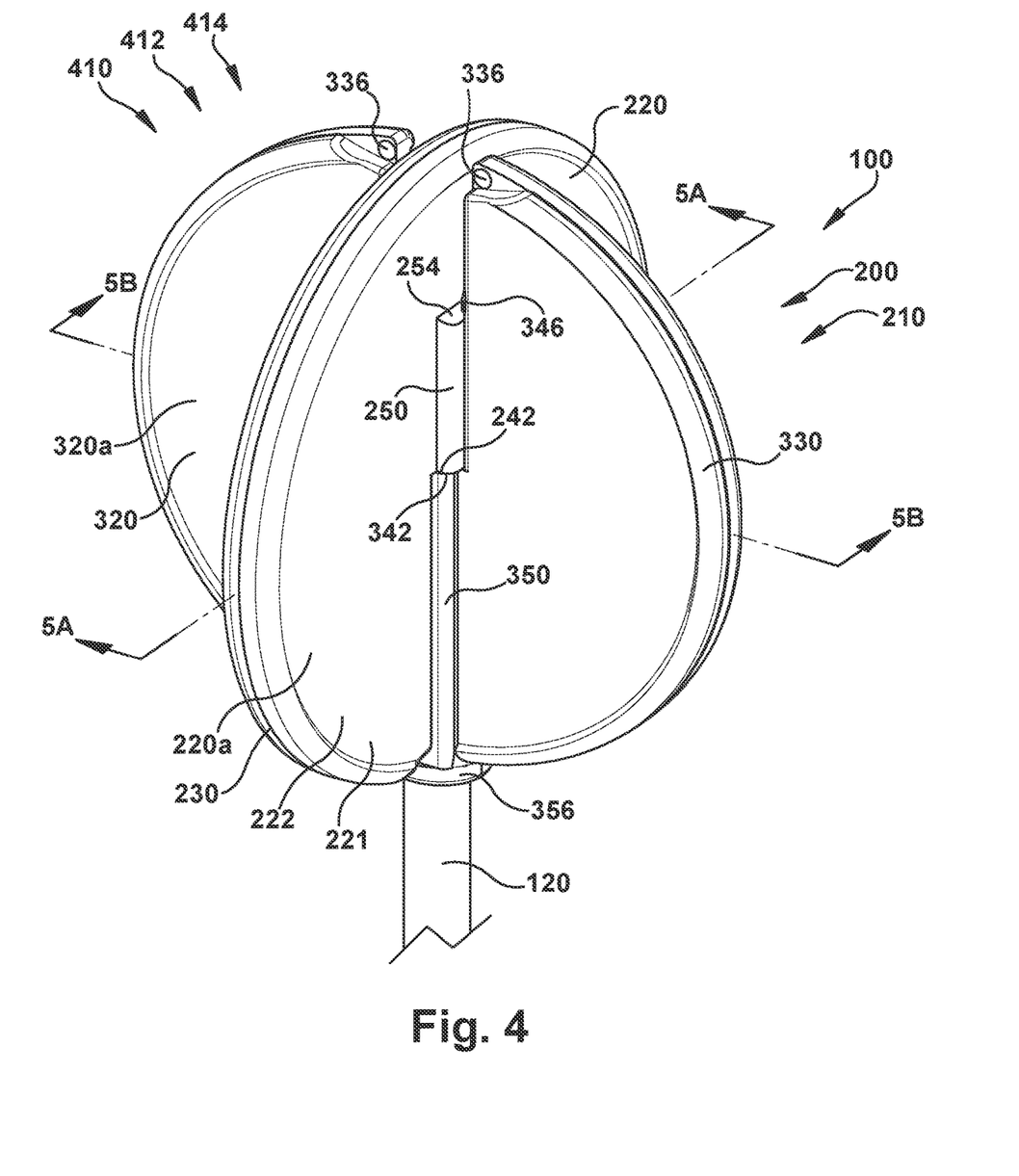
FIG. 4 is a schematic enlarged perspective view of an upper portion of the road or driveway marker of FIG. 1.
Figure 5A:
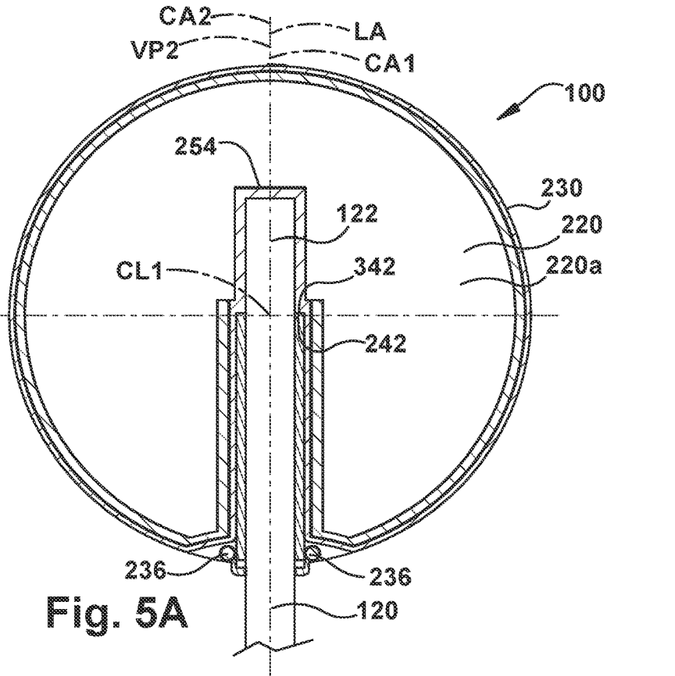
FIG. 5A is a schematic vertical section view of the upper portion of the road or driveway marker of FIG. 1, as seen from a plane indicated by the line 5A-5A in FIG. 4.
Figure 5B:
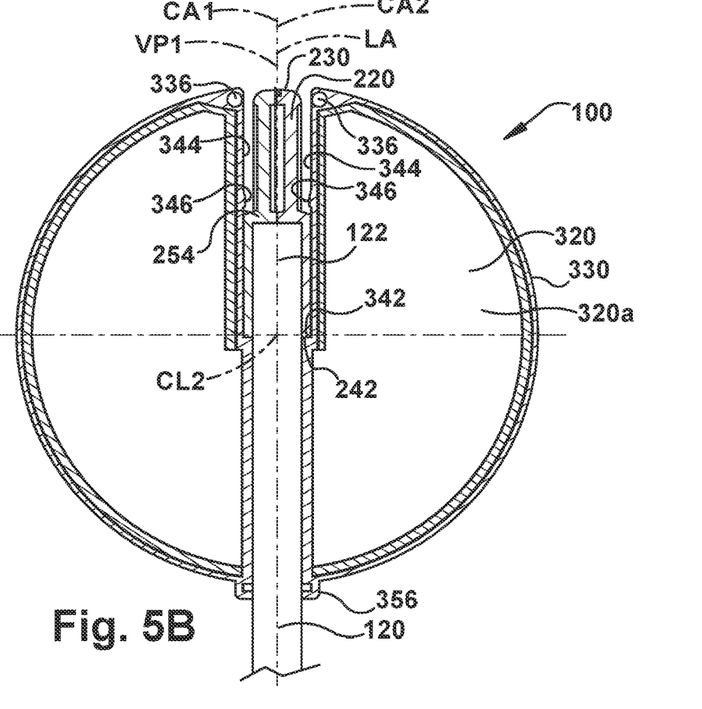
FIG. 5B is a schematic vertical section view of the upper portion of the road or driveway marker of FIG. 1, as seen from a plane indicated by the line 5B-5B in FIG. 4.

As can best be seen in FIG. 5B, the pair of tabs 346 are positioned along the pair of side walls 344 of the second reflector 320 such that, when the second reflector 320 is slid in a vertical upward direction UP along the support post 110, such that the first and second reflectors 220, 320 are in the overlapping configuration 412, the pair of radially extending tabs 346 of the second, lower reflector 320 snap fits over the upper end wall 254 of the rib a truncated protuberance or rib of the first, upper reflector 220 to interlock the first and second reflectors 220 320 together in the overlapping configuration 412. Additionally, the lower end wall 242 of the rib 250 of the first reflector 230 engages or abuts the upper end wall 342 of the rib 350 of the second reflector 320 to limit the extent of travel of the second reflector 320 as it is moved in the upward direction UP with respect to the first reflector 220 the orthogonal positional relationship 410 wherein the second reflector 320 overlaps and interlocks with the first reflector 220 in the overlapping configuration 412. Advantageously, the first central open portion or cavity 240 of the central region 241 of the first body 220a of the first reflector 220 is sized to receive the raised rib 350 of the central region 341 of the second body 320a of the second reflector 320 and the second central open portion or cavity 340 of the central region 341 of the second body 341 of the second reflector 320 is sized to receive the raised rib 250 of the central region 241 of the first body 220a of the first reflector 220 thereby permitting the overlapping configuration 412.

In an upper region of the peripheral rim 230 where side walls 344 of the second central open portion or cavity 340 intersect the peripheral rim 330 there are a pair of cut out regions 334 each of which extends approximately half way of a total depth D2 between the first and second reflective surfaces 322, 324. Each of the pair of cut out regions 334 includes a generally planar base 338 extending along the central vertical plane VP2 of the second reflector 320. Each base 338 includes a laterally extending recess 336 which extends orthogonally with respect to the base 338. As mentioned above, the laterally extending projections 236 of the first reflector 220 engage corresponding laterally extending recesses 336 of the second reflector 320 to interlock the first and second reflectors 220, 320 in the interlocking region 406 when the pair of reflectors 210 are in the parallel position relationship 400 or stacked configuration 402 (FIGS. 6, 7A and 7B). Further, since the rib 250 of the first, upper reflector 220 defines the blind hole 252, as opposed to a through bore, the first reflector 220 cannot slide down the support post 110, even under windy or wet conditions. In the stacked configuration, the laterally extending projections 236 of the first reflector 220 engage corresponding laterally extending recesses 336 of the second reflector 320 to interlock the first and second reflectors 220, 320 thus mitigating the possibility of the second reflector 320 sliding down the support post 110. The addition of the o-ring (not shown) on the support post 100 bearing against the cylindrical boss 356 of the rib 350 of the second reflector 320 further mitigates the possibility of the second reflector 320 detaching from the first reflector 220 and sliding down the support post 110.

Second Exemplary Embodiment—Reflective Marker 1000

Figures 14, 15:
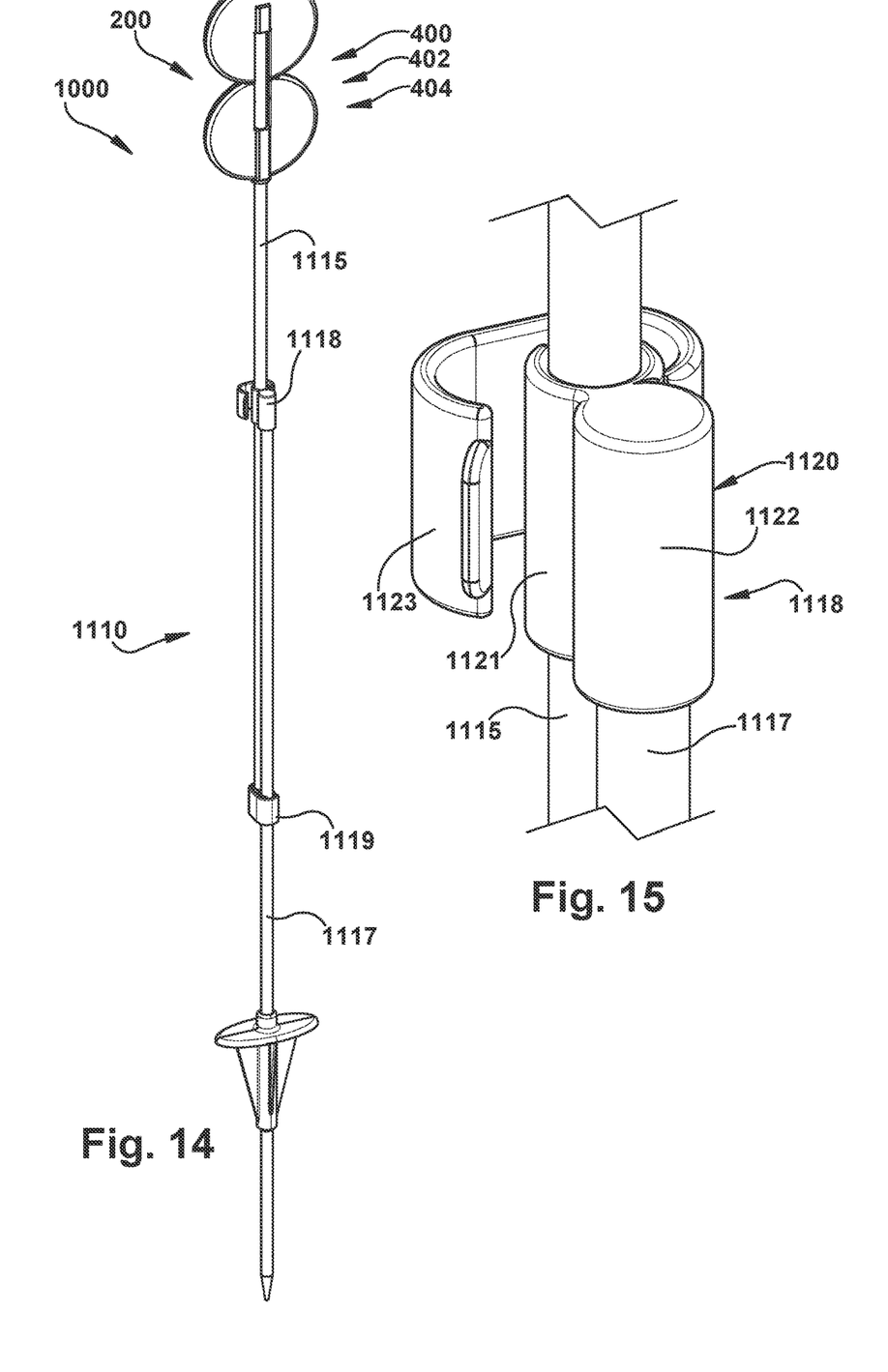
FIG. 14 is a schematic perspective view of a second exemplary embodiment of a reflective road or driveway marker of the present disclosure, with a two part adjustable height support post.
FIG. 15 is a schematic perspective view of a portion of the road or driveway marker of FIG. 14, depicting an upper connector of the two part adjustable height support post.

A second exemplary embodiment of the roadway or driveway marker of the present disclosure is schematically depicted at 1000 in FIGS. 14 and 15. The marker 1000 includes a reflector assembly, including a pair of reflectors, similar in structure and function to the reflector assembly 200, including the pair of reflectors 210, of the marker 100 of the first exemplary embodiment and will not be further discussed. In the marker 1000, the support standard or post 1100 is a height-adjustable two part assembly or compound support post. Specifically, the compound support post 1100 includes an upper post member 1500 and a parallel lower post member 1700, coupled for height adjustment by a pair of couplers or connectors 1118, 1119. The upper connector 1118 includes a body 1120 comprising an open cylindrical collar 1121 and a closed cylindrical socket 1122 in parallel relationship. The open cylindrical collar 1121 sliding receives the upper post member 1500, while the closed cylindrical socket 1122 receives an upper distal end of the lower post member 1117. A pivoting clasp 1123 pivots between an open position (FIG. 15) wherein the upper post member 1500 may slide within the open cylindrical collar 1121 and a closed position (shown by the lower coupler 1119 in FIG. 14) where the clasp 1123 wraps around an outer surface of the open cylindrical collar 1121 and engages or snap fits against an outer surface of the closed cylindrical socket 1122 and thereby urges the open cylindrical collar 1121 of the upper connector 1118 against the upper post member 1500.

The respective bodies 1120 of the upper and lower couplers/connectors 1118, 1119 are is configured to move between and open and closed position, in the open position, vertical movement of the upper support post 1115 with respect the lower support post 1117 is permitted and. in the closed position, vertical movement of the upper support post 1115 with respect the lower support post 1117 is inhibited. In FIGS. 14 and 15, the upper coupler 1118 is in the open position and in FIG. 14, the lower coupler 1119 is in the closed position. Specifically, when the respective pivoting clasps 1123 of the upper and lower connectors 1118, 1119 are in the closed position, vertical movement of the upper support post 1115 with respect the lower support post 1117 is inhibited. When the respective pivoting clasps 1123 of the upper and lower connectors 1118, 1119 are in the open position, vertical movement of the upper support post 1115 with respect the lower support post 1117 is permitted thereby allowing vertical adjustment of the height of the compound support post 1100.

As used herein, terms of orientation and/or direction such as upward, downward, forward, rearward, upper, lower, inward, outward, inwardly, outwardly, horizontal, horizontally, vertical, vertically, distal, proximal, axially, radially, etc., are provided for convenience purposes and relate generally to the orientation shown in the Figures and/or discussed in the Detailed Description. Such orientation/direction terms are not intended to limit the scope of the present disclosure, this application and the invention or inventions described therein, or the claims appended hereto.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A reflective marker for marking driveways and roadways, the reflective marker comprising:
    a) a support post having an upper portion and a lower portion for securing the reflective marker to a substrate;
    b) a first reflector bisected by a central axis, the first reflector including a first outer surface, a second outer surface and a peripheral rim extending between the first and second outer surfaces, the first outer surface including a first reflecting surface and the second outer surface including a second reflecting surface facing in a direction transverse to the first reflecting surface, the first reflector further including a central region extending along the central axis, the central region including a first open portion extending through the peripheral rim and a raised rib including an opening sized to receive the upper portion of the support post;
    c) a second reflector bisected by a central axis, the second reflector including a third outer surface, a fourth outer surface and a peripheral rim extending between the third and fourth outer surfaces, the third outer surface including a third reflecting surface and the fourth outer surface including a fourth reflecting surface facing in a direction transverse to the third reflecting surface, the second reflector further including a central region extending along the central axis including a second open portion extending through the peripheral rim and a raised rib defining a through bore extending from the second open portion, a diameter of the through bore sized to receive the upper portion of the support post; and
    d) wherein, in an overlapping configuration of the first and second reflectors, the raised rib of the central region of the second reflector is received in the first open portion of the central region of the first reflector and the raised rib of the central portion of the first reflector is received in second open portion of the central region of the second reflector.

2. The reflector marker of claim 1 wherein the opening of the raised rib of the central region of the first reflector is a blind hole which receives an upper portion of a support post.

3. The reflector marker of claim 1 wherein the opening of the raised rib of the central region of the second reflector is a through bore which receives an upper portion of a support post.

4. The reflective marker of claim 1 wherein the first open portion of the central region of the first reflector extends along substantially one half of a diameter of the first reflector as measured along the central axis of the first reflector.

5. The reflective marker of claim 1 wherein the first open portion of the central region of the second reflector extends along substantially one half of a diameter of the second reflector as measured along the central axis of the second reflector.

6. The reflective marker of claim 1 wherein the raised rib of the central region of the first reflector includes a lower end wall adjacent the first open portion of the central region of the first reflector and the raised rib of the central region of the second reflector includes an upper end wall adjacent the second open portion of the central region of the second reflector, the upper end wall of the raised rib of the second reflector contacting the lower end wall of the raised rib of the first reflector in the overlapping configuration of the first and second reflectors.

7. The reflective marker of claim 6 wherein the raised rib of the central region of the first reflector includes an end wall spaced radially inwardly of the peripheral rim of the first reflector and the second open portion of the central region of the second reflector is defined by opposing inner wall portions having at least one radially inwardly extending tab, the at least one radially inwardly tab positioned adjacent the end wall of the raised rib of the central region of the second reflector to interlock the first and second reflectors in the overlapping configuration.

8. The reflective marker of claim 6 wherein, in the overlapping configuration of the first and second reflectors, the first and second first and second reflectors are substantially orthogonal.

9. The reflective marker of claim 1 wherein the first reflector includes at least one laterally extending projections adjacent the peripheral rim and the first open portion of the central region, the second reflector includes at least one recess adjacent the peripheral rim and the second open portion of the central region, the at least one laterally extending projection of the first reflector received in the at least one recess of the second reflector to interlock the first and second reflectors in a stacked configuration of the first and second reflectors.

10. The reflective marker of claim 1 wherein the support post includes an upper post member comprising the upper portion of the support post and a lower post member comprising the lower portion of the support post and a pair of couplers securing the upper and lower post members, in an open position of the pair of couplers, vertical movement of the upper support post with respect the lower support post is permitted thereby allowing vertical adjustment of the height of the support post and in a closed position of the pair of couplers, vertical movement of the upper support post with respect the lower support post is inhibited.

11. A reflector assembly adapted to be secured to a support post for marking driveways and roadways, the reflector assembly comprising:
   a) a first reflector bisected by a central axis, the first reflector including a first outer surface, a second outer surface and a peripheral rim extending between the first and second outer surfaces, the first outer surface including a first reflecting surface and the second outer surface including a second reflecting surface facing in a direction transverse to the first reflecting surface, the first reflector further including a central region extending along the central axis, the central region including a first open portion extending through the peripheral rim and a raised rib extending from the first open portion and including an opening sized to receive an upper portion of a support post;
   b) a second reflector bisected by a central axis, the second reflector including a third outer surface, a fourth outer surface and a peripheral rim extending between the third and fourth outer surfaces, the third outer surface including a third reflecting surface and the fourth outer surface including a fourth reflecting surface facing in a direction transverse to the third reflecting surface, the second reflector further including a central region extending along the central axis including a second open portion extending through the peripheral rim and a raised rib extending from the second open portion and including an opening sized to receive an upper portion of a support post; and
   c) wherein, in an overlapping configuration of the first and second reflectors, the first open portion of the central region of the first reflector receives the raised rib of the central region of the second reflector and the second open portion of the central region of the second reflector receives the raised rib of the central region of the first reflector.

12. The reflector assembly of claim 11 wherein the opening of the raised rib of the central region of the first reflector is a blind hole which receives an upper portion of a support post.

13. The reflector assembly of claim 11 wherein the opening of the raised rib of the central region of the second reflector is a through bore which receives an upper portion of a support post.

14. The reflector assembly of claim 11 wherein the first open portion of the central region of the first reflector extends along substantially one half of a diameter of the first reflector as measured along the central axis of the first reflector.

15. The reflective assembly of claim 11 wherein the first open portion of the central region of the second reflector extends along substantially one half of a diameter of the second reflector as measured along the central axis of the second reflector.

16. The reflective assembly of claim 11 wherein the raised rib of the central region of the first reflector includes a lower end wall adjacent the first open portion of the central region of the first reflector and the raised rib of the central region of the second reflector includes an upper end wall adjacent the second open portion of the central region of the second reflector and spaced inwardly of the peripheral rim of the second reflector, the upper end wall of the raised rib of the second reflector contacting the lower end wall of the raised rib of the first reflector in the overlapping configuration of the first and second reflectors.

17. The reflective assembly of claim 16 wherein the raised rib of the central region of the first reflector includes an end wall spaced radially inwardly of the peripheral rim of the first reflector and the second open portion of the central region of the second reflector is defined by opposing inner wall portions having at least one radially inwardly extending tab, the radially inwardly tab positioned adjacent the end wall of the raised rib of the central region of the second reflector to interlock the first and second reflectors in the overlapping configuration of the first and second reflectors.

18. The reflective assembly of claim 16 wherein, in the overlapping configuration of the first and second reflectors, the first and second reflectors are substantially orthogonal.

19. The reflective assembly of claim 11 wherein the first reflector includes at least one laterally extending projections adjacent the peripheral rim and the first open portion of the central region, the second reflector includes at least one recess adjacent the peripheral rim and the second open portion of the central region, the at least one laterally extending projection of the first reflector received in the at least one recess of the second reflector to interlock the first and second reflectors in a stacked configuration of the first and second reflectors.

20. A reflective marker comprising:
a) a support post having an upper portion and a lower portion for securing the reflective marker to a substrate;
b) a first reflector bisected by a central axis, the first reflector including a peripheral rim, a first reflecting surface and a second reflecting surface facing in a direction transverse to the first reflecting surface, the first reflector further including a central region extending along the central axis, the central region including a first open portion extending through the peripheral rim and a raised rib including an opening sized to receive the upper portion of the support post;
c) a second reflector bisected by a central axis, the second reflector including a peripheral rim, a third reflecting surface and a fourth reflecting surface facing in a direction transverse to the third reflecting surface, the second reflector further including a central region extending along the central axis including a second open portion extending through the peripheral rim and a raised rib defining a through bore extending from the second open portion, a diameter of the through bore sized to receive the upper portion of the support post; and
d) the first open portion of the central region of the first reflector is sized to receive the raised rib of the central region of the second reflector and the second open portion of the central region of the second reflector is sized to receive the raised rib of the central region of the first reflector.

* * * * *